Sept. 20, 1971      C. P. PAWSAT      3,606,110
BICYCLE BASKET AND SUPPORT MEANS THEREFOR
Filed June 20, 1969
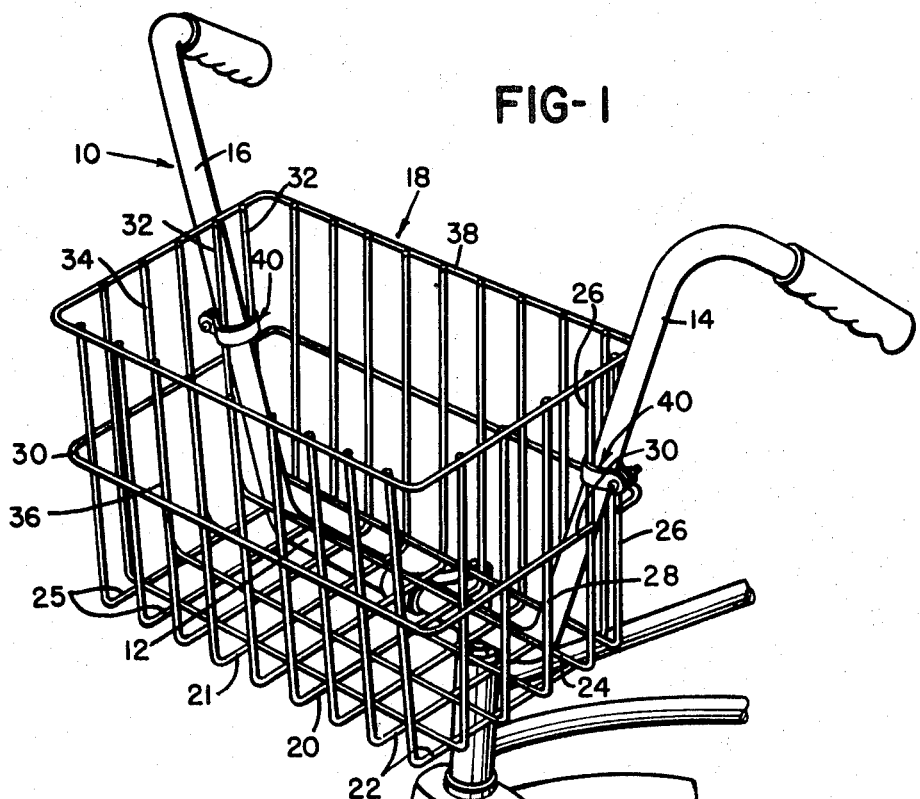
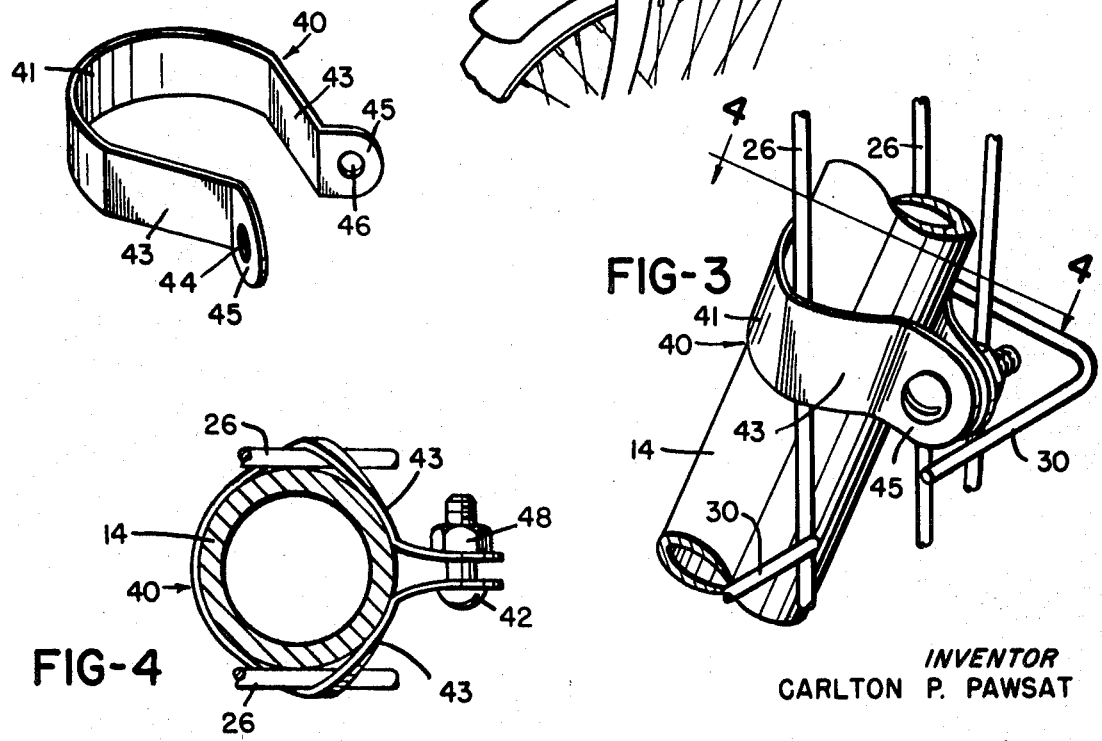
INVENTOR
CARLTON P. PAWSAT
BY *J. Warren Kinney Jr.*
ATTORNEY

United States Patent Office 3,606,110
Patented Sept. 20, 1971

3,606,110
BICYCLE BASKET AND SUPPORT MEANS THEREFOR
Carlton P. Pawsat, Maysville, Ky., assignor to Wald Manufacturing Company, Incorporated, Maysville, Ky.
Filed June 20, 1969, Ser. No. 835,194
Int. Cl. B62j 7/06
U.S. Cl. 224—36                    10 Claims

ABSTRACT OF THE DISCLOSURE

A bicycle basket having opposed side walls, each of which include channels defined by a pair of laterally spaced wires to receive the upwardly and outwardly extending portions of a handlebar, is securely though releasably anchored to the handlebar by clamps which engage each channel-defining pair of spaced wires at their intersection with the aforesaid portions of the handlebar.

---

In bicycles having a handlebar with portions extending upwardly and outwardly from a horizontal portion, it is desired to support a basket solely from and between the outwardly and upwardly extending handlebar portions. This eliminates any requirement for support by the axle of the front wheel. However, in order that the basket may have sufficient capacity, its width cannot be limited to the length of the intermediate or horizontal portion of the handlebar.

Heretofore, baskets have been provided in which the width of the basket is greater than the length of the horizontal portion of the handlebar and wherein channel means have been formed in the side walls of the basket to accommodate the upwardly and outwardly extending portions of the handlebar which extend into and beneath the bottom of the basket and project upwardly exteriorly of the basket between the top and bottom of the basket.

The previously employed basket has been secured to the horizontal portion of the handlebar through straps. However, straps cannot be kept tight which results in annoying basket rattle. A further disadvantage of straps resides in their inherent unsightlyness.

The present invention satisfactorily overcomes the foregoing problem of the basket rattling by securing the basket with a unique locking arrangement between a pair of vertical wires which collectively constitute a handlebar receptive side channel in each of the side portions of the basket and the upwardly and outwardly extending portion of the handlebar disposed within said side channel. Thus, with the securing means of the present invention, the side portions of the basket are locked to the upwardly and outwardly extending portions of the handlebar whether the bottom portion of the basket is supported on the upper surface of the horizontal portion of the handlebar or not.

As object of the present invention is to provide a simple, sturdy, foolproof and inexpensive mounting arrangement for securing a bicycle basket to the upstanding portions of a handlebar.

Other objects of this invention will be readily perceived from the following description, claims, and drawing.

The attached drawing illustrates a preferred embodiment of the invention, in which:

FIG. 1 is a perspective view of a portion of a bicycle having a basket mounted thereon according to the present invention;

FIG. 2 is an enlarged perspective view of one of the locking clamps for securing the basket to the handlebar;

FIG. 3 is an enlarged perspective view showing the clamping of one of the side portions of the basket to one of the upwardly and outwardly extending portions of the handlebar; and FIG. 4 is a sectional view, partly in plan, showing the securing of the basket to one of the upwardly and outwardly extending portions of the handlebar and taken along line 4—4 of FIG. 3.

Referring to the drawing and particularly FIG. 1, there is shown a bicycle handlebar 10 including an intermediate or horizontal portion 12, which is attached to the steering post of a bicycle by conventional means not relevant to this invention. The handlebar 10 has a first portion 14 extending upwardly and outwardly from one end of the horizontal portion 12 and a second portion 16 extending upwardly and outwardly from the other end of the horizontal portion 12.

A wire basket 18 is supported by the handlebar 10, and as illustrated in FIG. 1 the bottom or lower support portion 20 of the basket may rest on the upper surface of the horizontal portion 12 of the handlebar 10 through having a plurality of horizontally and longitudinally extending wires 21 in its central portion engaging the upper surface of the horizontal portion 12 of the handlebar 10.

The lower support portion 20 of the wire basket 18 has its two outermost horizontally and longitudinally extending wires 22 on one side thereof omitted between two of its horizontally and transversely extending wires 24 for providing an open side channel in the side wall of the basket below top frame wire 38. The two transverse wires 24 extend on opposite sides of the horizontal portion 12 of the handlebar 10 and are disposed parallel to the axis of the horizontal portion 12 of the handlebar 10. This arrangement provides a first channel in the lower support portion 20 of the basket 18 on one side of the centrally disposed longitudinal wires 21, which support the basket 18 on the horizontal portion 12 of the handlebar 10, to allow the upwardly and outwardly extending portion 14 of the handlebar 10 to extend into the interior of the basket 18.

The lower support portion 20 of the wire basket 18 has its outermost two horizontally and longitudinally extending wires 25 on the opposite side of the centrally disposed longitudinal wires 21 from the wires 22 also omitted between the two transverse wires 24. As a result, a second channel is formed in the lower support portion 20 of the basket 18 on the opposite side of the lower support portion 20 from the first channel to allow the upwardly and outwardly extending portion 16 of the handlebar 10 to extent into the interior of the basket 18.

At one side of the lower support 20 of the basket 18, the two transverse wires 24 are bent upwardly at right angles to their horizontal portions, which form part of the lower support portion 20 of the basket 18, to form vertical struts 26 that comprise a part of a side portion 28 of the basket 18. Each pair of laterally spaced side wires 26—26 define the sides of a handlebar receptive channel. An intermediate horizontal wire 30, which forms part of the front, rear and side portions of the basket is omitted between the vertical struts 26 so as to form a continuation of the first channel in the lower portion 20 of the basket 18 to the side portion 28 of the basket 18. The omission of the wire 30 between the vertical struts 26 allows the upwardly and outwardly extending portion 14 of the handlebar 10 to pass exteriorly of the basket 18 below the top frame wire 38.

The two transverse wires 24 are bent upwardly at the opposite side of the lower support portion 20 from that at which they form the vertical struts 26 to form a pair of vertical struts 32 that comprise a part of side portion 34 of the basket 18. The wire 30, which was omitted between the vertical struts 26, continues around the entire periphery of the basket 18 and also is omitted between the vertical struts 32 to form a continuation of the second channel, which is formed in the lower support portion 20 of the basket 18 by omitting portions of the longitudinal wires 25 between the transverse wires 24.

As a result, a continuous channel is formed from the lower support portion 20 of the basket 18 to the side portion 34 of the basket 18 to accommodate the upwardly and outwardly extending portion 16 of the handlebar 10. Thus, the channel, which is formed between the vertical struts 32 by omission of the wire 30, allows the upwardly and outwardly extending portion 16 of the handlebar 10 to extend exteriorly of the basket 18.

As shown in FIG. 1, the wires 21, 22 and 25 are bent upwardly to form a forward portion 36 of the basket 10 through cooperation with the wire 30. Likewise, the wires 21, 22 and 25 are bent upwardly at the rear for cooperation with the wire 30 to form a rear portion 38 of the basket 18.

The basket is fixed to the portions 14 and 16 of the handlebar 10 by clamps 40, at those locations where the channel-defining pairs (26—26 and 32—32) of side wires intersect or engage the handlebar portions which are received therein and which extend therethrough.

As shown in FIGS. 3 and 4, clamp 40 surrounds the vertical struts 26 and also engages against the portion 14 of the handlebar 10 when a bolt 42 is passed through openings 44 and 46 in the ends of the clamp 40 and the ends of the clamp 40 are brought towards each other by threading a nut 48 on the bolt 42.

Another of the clamps 40 secures the side portion 34 of the basket 18 to the upwardly and outwardly extending portion 16 of the handlebar 10 by surrounding the vertical struts 32. Thus, the clamps 40 secure the side portions 28 and 34 of the basket 18 to the handlebar 10.

Since the two transverse wires 24 of the basket 18 are continuous so as to extend upwardly to form parts of the side portions 28 and 34 as well as forming part of the lower support 20 of the basket 18, the pulling together of the two transverse wires 24 against the portions 14 and 16 of the handlebar 10 causes the transverse wires 24 to engage tightly against the portions 14 and 16 of the handlebar 10 as the portions 14 and 16 initially extend upwardly from the horizontal portion 12 of the handlebar 10. This also aids in insuring a tight fit of the basket 18 on the handlebar 10.

With particular reference now to FIG. 2 it will be noted that clamp 40 comprises a central, arcuate portion 41, intermediate straight portions 43 and terminal portions 45 having openings 44 and 46 therethrough.

When securing a basket to the upwardly extending portions 14 and 16 of the handlebar, arcuate portion 41 is disposed around and engages the handlebar members 14 and 16 with intermediate portions 43 of the clamp initially separated to extend around and embrace the channel-defining vertical struts 26—26, and 32—32 of the basket after which the intermediate portions are flexed, as best illustrated in FIGS. 3 and 4 whereby to parallel and completely engage struts 26—26 and 32—32 through the entire vertical height, or width, of the clamp. When bolt 42 is inserted into openings 44 and 46 of the terminal ends 45 of the clamp, the intermediate portions 43 will be drawn against and into contacting relationship with those portions of handlebars 14 and 16 remote from those portions engaged by arcuate portion 41 with the basket struts 26—26 and 32—32 securely though releasably anchored to upstanding handlebar portions 14 and 16. The resultant connection is analogous to a weld insofar as the connection between the basket and handlebar is concerned.

It should be understood that in certain installations the amount by which a basket is received within a handlebar will be determined by contact of the top frame wire 38 with the inner surfaces of handlebar portions 14 and 16, however regardless of where the supporting contact occurs the basket will be securely though releasably anchored to the handlebar portions wherever they intersect the channel-defining pairs of side wires or struts 26—26 and 32—32.

What is claimed is:

1. A wire basket for mounting on a bicycle handle-bar having a horizontal portion and portions extending upwardly and outwardly from each end of the horizontal portion, said basket including:

a top defined by a continuous top frame wire;
a bottom;
and front, rear, and side portions extending upwardly from said bottom to said top;
said bottom and both of said side portions of the basket having channels formed therein to receive the upwardly and outwardly extending portions of a handlebar which extends through said bottom into the interior of said basket and thence through a corresponding side portion;
said channels being formed by a pair of laterally spaced wires; and
means to secure the channel of each side portion of the basket to an upwardly and outwardly extending portion of the handlebar at the point of intersection therewith.

2. The basket according to claim 1 in which:
said securing means surrounds each pair of said spaced wires.

3. The basket according to claim 2 in which the securing means also substantially surrounds the outwardly and upwardly extending portion of the handlebar.

4. The basket according to claim 2 in which the securing means includes:
a clamp engaging each of said pair of spaced wires; and
means to secure the free ends of said clamp to each other.

5. The basket according to claim 3 in which the securing means includes:
a clamp engaging each of said pair of spaced wires and the upwardly and outwardly extending portion of the handlebar extending between said pair of spaced wires; and
means to secure the free ends of said clamp to each other.

6. The basket according to claim 1 in which:
said bottom has a plurality of centrally disposed horizontally and longitudinally extending wires in contact with the upper surface of the horizontal portion of the handlebar to support said basket on the horizontal portion of the handlebar;
said channels in said bottom extends transversely from both sides of said centrally disposed longitudinal wires of said bottom.

7. The basket according to claim 6 in which:
the channels in said side portion of said basket are formed by a pair of spaced vertical wires; and
the securing means surrounds each of said pair of spaced vertical wires.

8. The basket according to claim 7 in which the securing means also substantially surrounds the outwardly and upwardly extending portion of the handlebar.

9. The basket according to claim 7 in which the securing means includes:
a clamp engaging each of said pair of channel defining spaced wires; and
means to secure the free ends of said clamp to each other.

10. The basket according to claim 8 in which the securing means includes:
a clamp having an arcuate, central portion,
a pair of intermediate portions and terminal ends, and wherein;

the central portions of each clamp engages those portions of the handlebar within the basket, the intermediate portions of each clamp engage the pair of basket wires between which the handlebar projects and also adjacent portions of the handlebar outside the basket, and means to secure and draw the terminal ends of each clamp together for distorting said intermediate portions to overlappingly engage said basket wires thoughout the entire width of the intermediate portion of each clamp for anchoring said wires directly to the handlebar.

References Cited

UNITED STATES PATENTS

| | | | |
|---|---|---|---|
| 575,536 | 1/1897 | Swanson | 224—35 |
| 2,358,671 | 9/1944 | Trippe | 224—30X |
| 3,140,025 | 7/1964 | Persons | 224—36 |

ROBERT G. SHERIDAN, Primary Examiner